April 8, 1952     M. F. B. PICARD ET AL     2,592,329
OPTICAL APPARATUS FOR MEASURING BY DEFLECTION
Filed Aug. 9, 1946
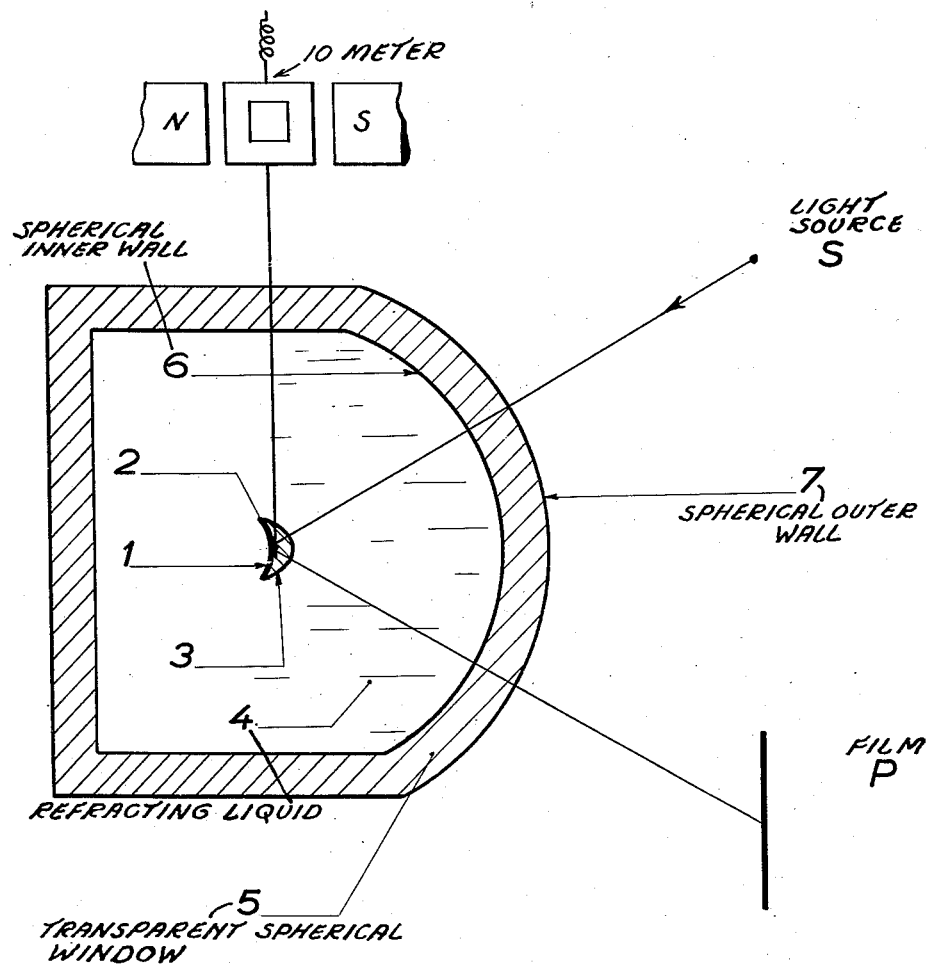
INVENTORS:
MARCEL SCHLUMBERGER
AND MAXIME FELIX BENOIT PICARD
BY:
Campbell, Brumbaugh & Free
their ATTORNEYS Patented Apr. 8, 1952

2,592,329

UNITED STATES PATENT OFFICE 2,592,329

OPTICAL APPARATUS FOR MEASURING BY DEFLECTION

Maxime Felix Benoit Picard and Marcel Schlumberger, Paris, France, assignors to Societe De Prospection Electrique Procedes Schlumberger, Paris, France, a corporation of France Application August 9, 1946, Serial No. 689,433
In France August 23, 1945

7 Claims. (Cl. 88—24)

Our invention has for its object improvements in apparatuses for the measurement by deflection such as galvanometers etc. comprising a revolving mirror or any other equivalent optical device that projects a pencil of rays on a graduated scale, a dial, a paper or sensitive film for the purpose of recording on charts, etc., in which the optical device is immersed in a liquid.

In apparatuses of this kind, the optical device is enclosed within a container filled with liquid, and the pencil of rays employed travels from the outside to the inside of this container and vice versa through a closed aperture by means of a transparent sheet, that is made generally of glass. As the liquid filling the container has an index of refraction differing from that of air, great trouble is experienced in securing on the scale, dial or sensitive film a sharp light-spot providing a definite reading or possibly the suitable recording of a chart. If it is assumed, in fact, that the optical revolving device is narrowed down to a flat mirror integral with the movable gear of the apparatus and that the aperture of the container is closed by a plate with parallel surfaces, then it is easy to realize that the assembly of mirror, liquid, and aperture forms a prism of a variable angle and that a pencil of polychromatic rays striking on the interior of the system will emerge from it with an increasing dispersion when the deviation from the mirror becomes greater, and will exhibit on the sensitive film a blurred light-spot, that is unreliable for recording. The trouble increases, moreover, from the fact that the refractive index of the liquid in which the revolving index is immersed, varies considerably as a general rule with the temperature so much so that an optical system that gives good readings at a certain temperature may develop inexactitude at another temperature. This is a series drawback especially when it is desired to record with instruments that are designed for employment elsewhere than in a laboratory as is especially the case for geophysical apparatuses etc.

The present invention aims at a cure for this drawback and for the perfection of optical devices that ensure, in every circumstance and within very wide ranges of temperature inside which it is desired to work the apparatus (included for instance between —20° C. and +60° C., as happens for instruments employed e. g. in geophysics), the projection of a light-spot giving especially a perfectly sharp record. To this end, the devices employed in accordance with the invention may comprise one or more of the following features:

a. The separating plate between the liquid in which the mirror or other equivalent device is immersed, and the free atmosphere will assume preferably the shape of a hollow spherical member that is centered at the very least closely on the central point of the mirror, in such a way that the incident rays that strike the mirror and are reflected by the mirror cross the two surfaces of the plate in a substantially perpendicular course, thus cutting out the prism effect.

b. In order that the optical system made up of the mirror, the liquid in which it is immersed and the free atmosphere may not have too great a power, the mirror will be preferably convex, instead of being flat, and its curvature will be figured in such a way that the focal length of the assembly has an appropriate value.

c. In front of the reflecting member, such as a mirror or the like means, is arranged a lens of given power and made of a glass with a suitable refractive index and of which the characteristics will be selected as a function of the other characteristics of the optical system, in such a manner that the total power of the assembly may be practically independent of the temperature, which condition may be obtained in practice as applicant has been able to prove. In practice, the lens and the reflecting mirror may be formed into a single unit in accordance with the invention and this unit will consist of a lens with a silvered back.

d. The transparent plate dividing the liquid from the atmosphere, instead of being formed by a simple thin wall may be made up of a comparatively thick plate bounded by two surfaces that are concentric with the central point of the spherical mirror, and the thickness of which will be calculated so as to cut out chromatic aberration or chromatism on the axis.

Other objects and features of the invention will make their appearance throughout the description given below in the accompanying drawing that deals with a special method of carrying into effect the present invention.

In the drawing, a diagrammatic section is shown of an optical device in accordance with the invention. In the drawing, I denotes the mirror that is incorporated with the movable part of any suitable measuring apparatus 10; on which mirror a pencil of light originating from a light source S impinges; the mirror reflects the pencil onto a photographic film P that moves in a suitable way so as to allow a continuous record of the deviations of the movable parts of the measuring apparatus. The light-source S, as well as the photographic film P, may be formed and arranged in any suitable way in accordance with customary methods; the shape and arrangement of these members does not come into consideration as far as the present application is concerned.

In line with the invention, the mirror 1 is formed by the back silvered surface of a lens 2 of which the outer surface is shown at 3. The curvatures of the faces 1 and 3 of the lens will be selected as will be explained later in accordance with the invention.

The reflecting assembly is immersed in a liquid 4 that is divided from the atmosphere by a plate 5 that has, in accordance with the invention, a certain thickness and of which the surfaces separating it from the liquid 4, on the one hand, and from the outside atmosphere, on the other hand, are formed respectively by spherical surfaces 6 and 7 centered on the central point of the mirror 1.

A calculation may be made as follows of the various members of this optical device in order to secure the projection of a sharp light-spot on the film P in all circumstances and especially under any variations of temperature to which the assembly may be subjected.

In order to take into account these variations of temperature that cause, as stated above, a variation in the refractive index $n_4$ of the liquid 4, the following operation will be carried out:

In calculating the power $\Phi$ of the optical assembly it will be observed that this power is a function $f$ depending especially on the refractive index $n_4$. It will be supposed then that the derivative of this function in relation to the index $n_4$, for the value of this index corresponding to an average suitably selected temperature, 15° C. for instance, is zero, that will give a primary relationship between the different elements of the optical system;

If $n_2$ is called the refractive index of the lens 2, R the radius of the surface 1, $R_3$ the radius of the surface 3, $R_6$ the radius of the surface 6 and $R_7$ the radius of the surface 7 and $\rho_1$, $\rho_3$, $\rho_6$, and $\rho_7$ the reciprocals of the radii, this relationship will be written:

$$\frac{n_2}{n_4} = \frac{\rho_6 + \rho_3}{2(\rho_3 - \rho_1)}$$

Moreover, the chromatic aberration may be corrected in the following manner:

The power $\Phi$ of the optical assembly, the other data remaining unaltered, is a function of the refractive indices $n_2 - n_5$ of the lens 2 and the plate 5, that vary with the wave length of the light radiation employed. It is noted then, in regarding now $n_2$ and $n_5$ as independent variables, that the total differential of $\Phi$ is zero, supposing the differentials of the refractive indices $n_2$ and $n_5$ give out the dispersion of the corresponding glasses between two given spectrum-lines (lines F and G' for instance).

This leads to the second relationship:

$$(\rho_6 - \rho_7)\frac{\Delta n_5}{n_5^2} + (\rho_1 - \rho_3)\frac{\Delta n_2}{n_4^2} = 0$$

$\Delta n_5$ and $\Delta n_2$ being respectively the dispersion of the glasses forming the lens 2 and the enclosing glass 5.

By placing on $\Phi$ a given value to ensure the optical operation contemplated and settling the value of $R_1$ consistent with the possible dimensions of the arrangement two other equations are obtained that with the two equations given above completely define the system.

*Numerical example.*—Suppose for instance it is desired to execute a system of a power $\Phi$ of 4 dioptres with $R_1 = 50$ mm., and $\rho_7 = 20$ dioptres.

The index of refraction of the liquid will be taken equal to 1.5.

The glass of the mirror is for instance a barium crown with index 1.6 and its dispersion between the lines F and G' is 0.006.

The enclosing glass is an extra dense flint with an index 1.75 and a dispersion = 0.015.

The the following values are found:

$\rho_6 = 44.5$ dioptres $\quad r_6 = 22.472$ mm.
$\rho_3 = 51.5$ dioptres $\quad r_3 = 19.417$ mm.
$\rho_1 = 6.5$ dioptres $\quad r_1 = 153.85$ mm.

It will be observed that, in this calculation, only the thickness of the mirror has been omitted. This thickness may be very slight, for the dimensions of the mirror are always small; it is possible then to include it in the calculation of the focal line and to make the corrections on standard lines.

Obviously, numerous modifications can be introduced to the devices described without widening the scope of our invention that is not tied down in any way to the examples submitted for carrying the invention into effect.

What we claim is:

1. In an apparatus for optically measuring deflections, the combination of a pivoting member subjected to deflection, a reflecting surface rigid therewith, a source of light illuminating said reflecting surface, a hollow vessel enclosing said pivoting member, said vessel having a transparent spherical portion through which light may be transmitted from said source to said reflecting surface, said transparent spherical portion having concentric front and rear surfaces with centers of curvature located substantially at the pivoting point of the pivoting member, a refracting liquid in said vessel, said liquid having an index of refraction greater than one and extending to a level above said reflecting surface, and means outside of said vessel and in the path of the light reflected from the reflecting surface through said transparent spherical portion for providing measurements of said deflections.

2. In an apparatus for optically measuring deflections, the combination of a pivoting member subjected to deflection, a convex mirror rigid therewith, a source of light illuminating said convex mirror, a hollow transparent vessel enclosing said pivoting member, said vessel having a spherical portion through which light may be transmitted from said source to said convex mirror, said transparent spherical portion having concentric front and rear surfaces with centers of curvature located substantially at the pivoting point of the pivoting member, a refracting liquid in said vessel, said liquid having an index of refraction greater than one and extending to a level above said convex mirror, and means outside of said vessel and in the path of the light reflected from the convex mirror through said transparent spherical portion for providing measurements of said deflections.

3. In an apparatus for optically measuring deflections, the combination of a pivoting member subjected to deflection, a reflecting surface rigid therewith, a source of light illuminating said reflecting surface, a hollow transparent vessel enclosing said pivoting member, said vessel having a spherical portion through which light may be transmitted from said source to said reflecting surface, said transparent spherical portion having concentric front and rear surfaces with centers of curvature located substantially at the pivoting point of the pivoting member, a refracting liquid in said vessel, said liquid having an index of refraction greater than one and extending to a level above said reflecting surface, a lens of predetermined power and refraction index inside the liquid and interposed between the reflecting surface and the transparent vessel and shaped so as to provide a total power which is independent of the variations of the refraction indices with varying temperatures, and means in the path of light reflected from the reflecting surface through said transparent spherical portion for providing measurements of said deflections.

4. In an apparatus for optically measuring deflections, the combination of a pivoting member subjected to deflection, a lens with a rear reflecting surface rigid therewith, a source of light illuminating said reflecting surface through the lens, a hollow transparent vessel enclosing said pivoting member, said vessel having a spherical portion through which light may be transmitted from said source to said reflecting surface, said transparent spherical portion having concentric front and rear surfaces with centers of curvature located substantially at the pivoting point of the pivoting member, a refracting liquid in said vessel, said liquid having an index of refraction greater than one and extending to a level above said reflecting surface, and means outside of said vessel and in the path of the light reflected from the reflecting surface through said transparent spherical portion for providing measurements of said deflections.

5. In an apparatus for optically measuring deflections, the combination of a pivoting member subjected to deflection, a reflecting surface rigid therewith, a source of light illuminating said reflecting surface, a hollow transparent vessel enclosing said pivoting member, said vessel having a spherical portion through which light may be transmitted from said source to said reflecting surface, said transparent spherical portion having concentric front and rear surfaces with centers of curvature located substantially at the pivoting point of the pivoting member so as substantially to eliminate position chromatism, a refracting liquid in said vessel, said liquid having an index of refraction greater than one and extending to a level above said reflecting surface, and means outside of the vessel and in the path of the light reflected from the reflecting surface through said transparent spherical portion for providing measurements of said deflections.

6. In an apparatus for optically measuring deflections, the combination of a pivoting member subjected to deflection, a lens with a rear reflecting surface rigid therewith, a source of light illuminating said reflecting surface, a hollow transparent vessel enclosing said pivoting member, said vessel having a spherical portion through which light may be transmitted from said source to said reflecting surface, said transparent spherical portion having concentric front and rear surfaces with centers of curvature located substantially at the pivoting point of the pivoting member, a refracting liquid in said vessel, said liquid having an index of refraction greater than one and extending to a level above said reflecting surface, the lens and vessel wall being shaped so as to provide a total optic power independent of the variations of the refraction indices with varying temperatures, and means outside of the vessel and in the path of the light reflected from the reflecting surface through said transparent spherical portion for providing measurements of said deflections.

7. In optical apparatus for providing indications of deflections, the combination of a vessel provided with a spherical, transparent portion having concentric front and rear surfaces and containing a refracting liquid having an index of refraction greater than one, a reflecting member pivotally mounted in said vessel substantially at the center of curvature of the front and rear surfaces of said transparent spherical portion and submerged in said liquid, said reflecting member being rotatable in accordance with a deflection, a source of light disposed so as to illuminate said reflecting member through said transparent spherical portion, and means external of said vessel and in the path of light reflected from said reflecting member for providing indications of displacements of said reflected light.

MAXIME FELIX BENOIT PICARD.
MARCEL SCHLUMBERGER.

REFERENCES CITED

The following references are of record in the file of this patent:

UNITED STATES PATENTS

| Number | Name | Date |
|---|---|---|
| 1,098,905 | Jacob et al. | June 2, 1914 |
| 1,520,245 | Humbrecht | Dec. 23, 1924 |
| 1,871,380 | Legg | Aug. 9, 1932 |
| 1,960,169 | Schoenberg | May 22, 1934 |
| 1,982,333 | Thomander | Nov. 27, 1934 |
| 2,019,871 | Pettingill et al. | Nov. 5, 1935 |
| 2,295,802 | Nicoll | Sept. 15, 1942 |
| 2,384,540 | Flint | Sept. 11, 1945 |
| 2,428,369 | Kammer | Oct. 7, 1947 |